(12) United States Patent
Raveendran et al.

(10) Patent No.: US 8,320,464 B2
(45) Date of Patent: Nov. 27, 2012

(54) METHOD AND APPARATUS TO CONSTRUCT BI-DIRECTIONAL PREDICTED FRAMES FOR TEMPORAL SCALABILITY

(75) Inventors: Vijayalakshmi R. Raveendran, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1648 days.

(21) Appl. No.: 11/120,402

(22) Filed: May 2, 2005

(65) Prior Publication Data

US 2005/0265450 A1 Dec. 1, 2005

Related U.S. Application Data

(60) Provisional application No. 60/568,142, filed on May 4, 2004.

(51) Int. Cl.
*H04N 7/12* (2006.01)

(52) U.S. Cl. .............. 375/240.25; 375/240.15

(58) Field of Classification Search .......... 375/240, 375/240.01, 240.12, 240.15, 240.16, 240.25
See application file for complete search history.

(56) References Cited

U.S. PATENT DOCUMENTS

| | | | |
|---|---|---|---|
| 5,379,356 A | 1/1995 | Purcell et al. | |
| 5,805,225 A | 9/1998 | Tahara et al. | ............ 348/412 |
| 5,936,670 A | 8/1999 | Frencken | ................ 348/413 |
| 6,173,013 B1 * | 1/2001 | Suzuki et al. | ......... 375/240.16 |
| 6,212,237 B1 * | 4/2001 | Minami et al. | ......... 375/240.16 |
| 6,647,061 B1 * | 11/2003 | Panusopone et al. | .... 375/240.12 |
| 6,940,905 B2 * | 9/2005 | Van Der Schaar et al. | ............ 375/240.12 |
| 7,609,763 B2 * | 10/2009 | Mukerjee et al. | ........ 375/240.16 |
| 7,620,109 B2 | 11/2009 | Srinivasan | |
| 2002/0065952 A1 | 5/2002 | Sullivan et al. | ............. 709/328 |
| 2002/0172284 A1 | 11/2002 | Peng et al. | ............. 375/240.15 |

FOREIGN PATENT DOCUMENTS

| | | |
|---|---|---|
| GB | 2 240 005 A | 7/1991 |
| JP | 06326999 | 11/1994 |
| JP | 07131785 | 5/1995 |
| JP | 09102047 | 4/1997 |
| JP | 10509576 | 9/1998 |

(Continued)

OTHER PUBLICATIONS

"ISO/IEC 14496-2 Committee Draft"ISO/IEC JTC1/SC29/WG11 N1902, Oct. 1997, pp. I-XII.

(Continued)

*Primary Examiner* — Allen Wong
(74) *Attorney, Agent, or Firm* — Brent A. Boyd

(57) ABSTRACT

A method, apparatus and system for decoding a bi-directional picture predicted from two reference frames with a motion compensation codec that is capable of locating reference frame portions from only one reference frame at a time. Including locating a first reference frame portion from a first frame in a first pass, storing the first reference frame portion in memory; locating a second reference frame portion from a second frame in a second pass, and combining the first reference frame portion and the second reference frame portion to form a bi-directionally predicted portion. Also, a method and apparatus for restricting the encoding of a bi-directional picture predicted from two reference frames to be decoded by a motion compensation codec that is capable of locating reference frame portions from only one reference frame at a time and is capable of decoding a limited number of partitions for each macroblock.

39 Claims, 9 Drawing Sheets

FOREIGN PATENT DOCUMENTS

| | | |
|---|---|---|
| JP | 10294943 | 11/1998 |
| JP | 11504173 | 4/1999 |
| JP | 2003284064 | 10/2003 |
| JP | 2003333599 | 11/2003 |
| TW | 390090 B | 5/2000 |
| TW | 513892 B | 12/2002 |
| TW | 527837 B | 4/2003 |
| TW | 200406126 | 4/2004 |
| WO | WO9633474 | 10/1996 |
| WO | WO9711562 | 3/1997 |

OTHER PUBLICATIONS

Schwarz et al, "Tree Structured Macroblock Partition", ITU Study Group 16—Video Coding Experts Group, (Dec. 4, 2001), pp. 1-9.

Tambankar et al, "An overview of H.264 / MPEG-4 part 10", Feb. 7, 2003, Video/Image Processing and Multimedia Communication, 2003. 4$^{th}$ Eurasip Conference Focused on Jul. 2-5, 2003, Piscataway, NJ, USA, IEEE, (Jul. 2, 2007) pp. 1-51.

Taiwan Search Report—TW094114437—TIPO—Jul. 26, 2011.

International Search Report and Written Opinion—PCT/US2005/014714, International Search Authority—European Patent Office—Jan. 18, 2006.

Draft ITU-T Recommendation and Final Draft International Standard of Joint Video Specification (ITU-T Rec. H.264|ISO/IEC 14496-10 AVC), JVT-G050, Mar. 7-14, 2003, pp. 77-146 and 215-249.

Flierl et al., "Generalized B Pictures and the Draft H.264/AVC Video-Compresiion Standard", IEEE Trans. Circuit and Systems for Video Technology, vol. 13, No. 7, pp. 587-597, 2003.

\* cited by examiner

METHOD AND APPARATUS TO CONSTRUCT BI-DIRECTIONAL PREDICTED FRAMES FOR TEMPORAL SCALABILITY

CLAIM OF PRIORITY UNDER 35 U.S.C. §119

The present Application for Patent claims priority to Provisional Application No. 60/568,142 entitled "METHOD AND APPARATUS TO IMPLEMENT B-FRAMES AND SCALABILITY" filed May 4, 2004, and assigned to the assignee hereof and hereby expressly incorporated by reference herein.

BACKGROUND

1. Field

This invention relates to a method and apparatus for encoding and decoding scalable video data with efficient reuse of base layer modules for construction of enhancement layer frames.

2. Background

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, ISDN, cable, xDSL, fiber, LAN (local area network), WAN (wide area network) and others. The transmission mode can be either uni-cast or multi-cast. The variety of individual client devices, including PDA (personal digital assistant), laptop, desktop, set-top box, TV, HDTV (high-definition television), mobile phone and others, requires bitstreams of different bandwidths simultaneously for the same content. The connection bandwidth could vary quickly with the time (from 9.6 kbps to 100 Mbps and above), and can be faster than a server's reaction.

Similar to the heterogeneous IP network is mobile/wireless communication. Transport of multimedia content over mobile/wireless channels is very challenging because these channels are often severely impaired due to effects such as multi-path fading, shadowing, inter-symbol interference, and noise disturbances. Some other reasons, such as mobility and competing traffic, also cause bandwidth variations and loss. Factors such as channel noise and the number of users being served determine the time-varying property of channel environments. In addition to environmental conditions, the destination network can vary from second to third generation cellular networks to broadband data-only networks due to geographic location as well as mobile roaming. All these variables call for adaptive rate adjustment for multimedia content, even on the fly. Thus, successful transmission of video over heterogeneous wired/wireless networks requires efficient coding, as well as adaptability to varying network conditions, device characteristics, and user preferences, while also being resilient to losses.

To meet different user requirements and to adapt to channel variation, one could generate multiple independent versions of bitstreams, each meeting one class of constraints based on transmission bandwidth, user display and computational capability. But this is not efficient for server storage or network capacity. In scalable coding, where a single macro-bitstream accommodating high-end users is built at the server, the bitstreams for low-end applications are embedded as subsets of the macro-bitstream. As such, a single bitstream can be adapted to diverse application environments by selectively transmitting sub-bitstreams. Another advantage provided by scalable coding is for robust video transmissions on error prone channels. Error protection and error concealment can be easily handled. A more reliable transmission channel or a better error protection can be applied to base-layer bits that contain the most significant information.

There are spatial, temporal and signal to noise ratio (SNR) scalabilities in hybrid coders like MPEG-1, MPEG-2, MPEG-4 (collectively referred to as MPEG-x), H.261, H.262, H.263, and H.264 (collectively referred to as H.26x). In hybrid coding, temporal redundancy is removed by motion-compensated prediction (MCP). A video is typically divided into a series of groups of pictures (GOP), where each GOP begins with an intra-coded frame (I) followed by an arrangement of forward predicted frames (P) and bidirectional predicted frames (B). Both P-frames and B-frames are inter-frames. The B frame is the key to temporal scalability in most MPEG like coders. However, some profiles, such as the MPEG-4 Simple profile and the H.264 Baseline Profile, do not support B frames.

In MPEG-4, profiles and levels provide a means of defining subsets of the syntax and semantics based on the decoder capabilities required to decode a particular bitstream. A profile is a defined as a sub-set of the entire bitstream syntax. A level is a defined set of constraints imposed on parameters in the bitstream. For any given profile, levels generally correspond to decoder processing load and memory capability. So profiles and levels specify restrictions on bitstreams and hence place limits on the capabilities of decoding the bitstreams. In general, a decoder shall be deemed to be conformant to a given profile at a given level if it is able to properly decode all allowed values of all syntactic elements as specified by that profile at that level.

Evolutionary development, or migration, of modern microprocessor chipsets can be accomplished in an efficient manner when requirements can be met while keeping changes to software, firmware and hardware to a minimum. As discussed above, the MPEG-4 Simple profile and H.264 Baseline profile do not support B Frames for temporal scalability. Therefore, chipsets that were developed in conformance to these profiles may not support B Frames. With an increase in the popularity and demand of higher rate multimedia, and the networks supporting higher rate multimedia, an efficient migration path from MPEG-4 Simple profile or H.264 Baseline profile to a profile offering temporal scalability with B Frames is needed. The MPEG-4 standard is described in ISO/IEC 14496-2. The H.264 standard is described in [ISO/IEC 14496-10].

SUMMARY

Accordingly, embodiments disclosed herein provide a method and apparatus for providing scalable video coded data, via bi-directional prediction, based on a base layer non-temporal scaling design, with minimal change to the base layer software, firmware and hardware.

A video encoding and decoding system that enables scalable coding of a video stream through use of motion compensated bi-directional prediction, is described. An efficient design and use of base layer non-temporal scaling modules for construction of bi-directional predicted regions enables an efficient migration path for providing enhancement layer coding. A base layer non-temporal scaling module is used to decode bi-directional predicted regions by decoding each of the bi-directional reference regions in series and then combining the results to calculate the bi-directional predicted region.

DETAILED DESCRIPTION

Figure 1:
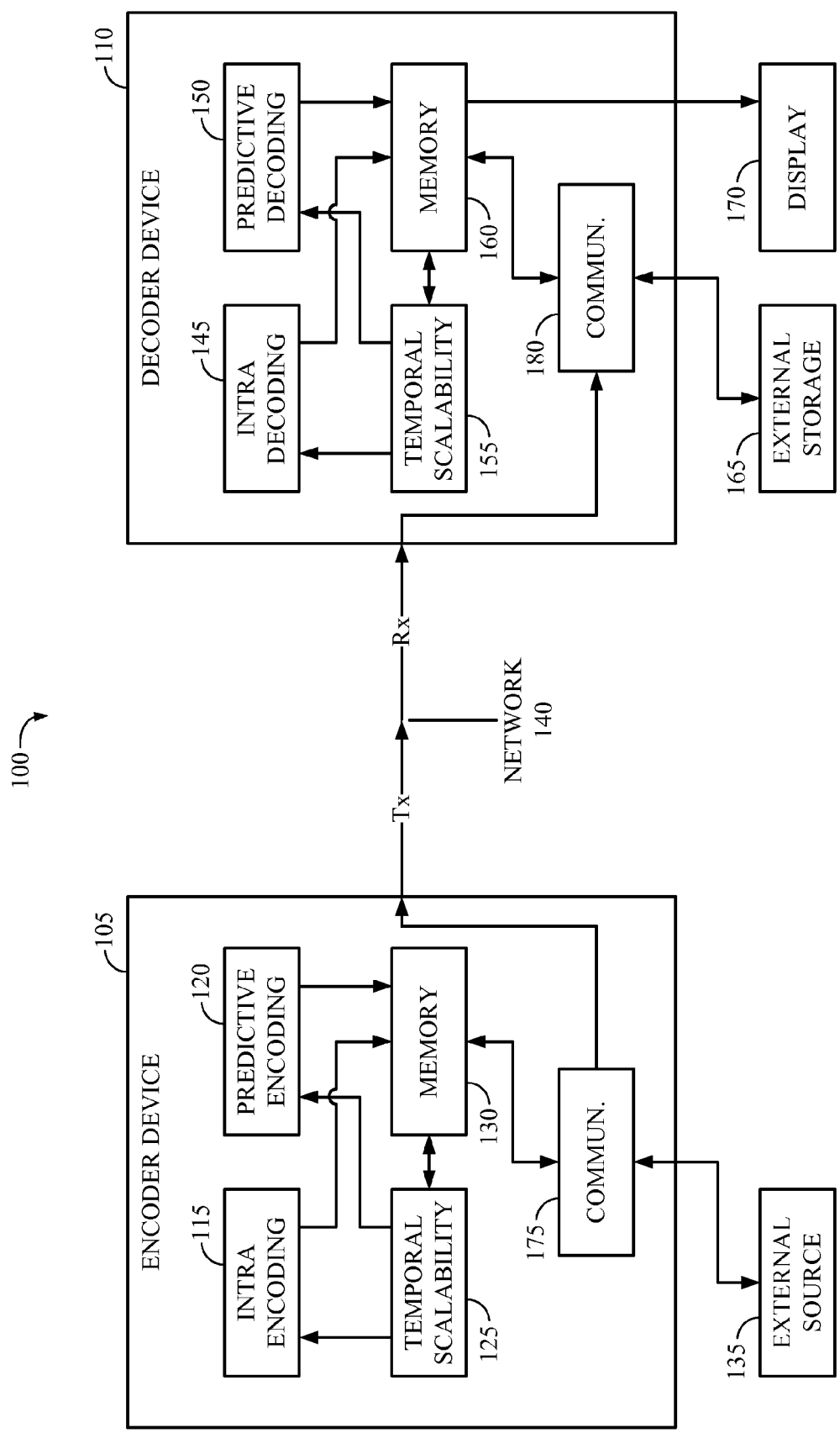
FIG. 1 is a block diagram of a general communications system for encoding and decoding streaming pictures.

A method, apparatus and system to provide scalable video coded data, via bi-directional prediction, based on a base layer non-scalable coding design with minimal change to the base layer software, firmware and hardware, is described. A base layer motion compensation codec can construct forward predicted or backward predicted P Frames. Also, the base-layer motion compensation codec can be modified with minimal change to software, firmware and hardware to construct forward/backward predicted (or bi-directional) B Frames. The same components used for decoding P frames can be utilized in series to decode B frames with multiple references. P Frames can be contained in a base layer while B Frames can be contained in an enhancement layer of a scalable video coded bitstream.

In the following description, specific details are given to provide a thorough understanding of the examples. However, it will be understood by one of ordinary skill in the art that the examples may be practiced without these specific details. For example, electrical components may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

A pair of video coding standards, known as MPEG-x and H.26x, describe data processing and manipulation techniques (referred to herein as hybrid coding) that are well suited to the compression and delivery of video, audio and other information using fixed or variable length source coding techniques. In particular, the above-referenced standards, and other hybrid coding standards and techniques, compress, illustratively, video information using intra-frame coding techniques (such as, for example, run-length coding, Huffman coding and the like) and inter-frame coding techniques (such as, for example, forward and backward predictive coding, motion compensation and the like). Specifically, in the case of video processing systems, Hybrid video coding systems are characterized by prediction-based compression encoding of video frames with intra- and/or inter-frame motion compensation encoding.

Intra-frame coding refers to encoding a picture (a field or a frame) without reference to any other picture, but the Intra-coded picture can be used as a reference for other pictures. The terms intra-frame, intra-coded frame and I Frame are all examples of video-objects formed with intra-coding that are used throughout this application.

Inter-frame coding, or predictive coding, refers to encoding a picture (a field or a frame) with reference to another picture. Compared to the Intra-coded picture, the Inter-coded or predicted picture may be coded with greater efficiency. Examples of inter-coded pictures that will be used throughout this application are predicted frames (either forward or backward predicted, also referred to as P frames), and bi-directional predicted frames (also referred to as B Frames). Other terms for inter-coding include high-pass coding, residual coding, motion compensated interpolation and others that are well known to those of ordinary skill in the art.

A technique, known as scalable coding, can divide Intra-coded pictures and the different inter-coded pictures (such as P Frames or B Frames) into different layers in the bitstream such as, for example, a base layer and an enhancement layer. Scalable coding, is useful in dynamic channels, where scalable bitstreams can be adapted to match fluctuations in network bandwidth. In error-prone channels, scalable coding can add robustness through unequal error protection of the base layer and the enhancement layer. Better error protection can be applied to the more important layer.

FIG. 1 is a block diagram of a general communications system for encoding and decoding streaming pictures. The system 100 includes encoder device 105 and decoder device 110. Encoder device 105 further includes intra encoding component 115, predictive encoding component 120, temporal scalability component 125, memory component 130 and communications component 175. These elements may be discrete components, or may be contained by one or more microprocessors or digital signal processors (DSPs). Encoder device 105 is able to receive data from external source 135 using communication logic contained in communications component 175. External source 135 could be, for example, external memory, the Internet, a live or delayed video and/or audio feeds, and receiving the data can include wired and/or wireless communications. The data contained in external source 135 can be in a non-encoded or encoded state. Intra encoding component 115 is used to encode intra-coded portions of frames (slices, macroblocks and sub-macroblocks). Predictive encoding component 120 is used to encode predicted portions of frames, including forward prediction, backward prediction and bi-directional prediction.

Encoder device 105 can access raw or encoded data for encoding. Encoded data can be accessed in order to replace already encoded portions with enhancement layer portions, such as bi-directionally predicted frames so as to provide temporal scalability. When accessing encoded data (either intra-coded or inter-coded data), the logic contained in intra encoding component 115 and predictive encoding component 120 decodes the encoded data, resulting in reconstructed raw data. This reconstructed raw data, or accessed raw data, can then be encoded in such a way as to provide an enhancement layer containing B frames for temporal scalability and/or low priority data.

Temporal scalability component 125 contains logic used to determine which portions of video data should be intra-coded by intra encoding component 115, and which portions should be inter-coded by predictive encoding component 120. Temporal scalability component 125 also contains logic for determining which portions of video are low priority and should be placed in the enhancement layer, and which portions are high priority and should be placed in a base layer. Temporal scalability component 125 encodes overhead information that can include a map of intra-coded and inter-coded portions, such as, for example a macro-block map where macroblocks (or sub-macroblocks) are identified as being intra-coded or inter-coded (also identifying which type of inter-coding including, for example forward, backward or bi-directional) and to which frame(s) inter-coded portions are referenced. After encoding, the encoded frames are stored in memory component 130 or external memory. The external memory can be contained within external source 135 or a separate memory component (not shown).

Communications component 175 contains logic used for data transmission (Tx) in conjunction with network 140. Network 140 can be part of a wired system such as telephone, cable, and fiber optic, or a wireless system. In the case of wireless, communication systems, network 140 can comprise, for example, part of a code division multiple access (CDMA or CDMA2000, or variations thereof, such CDMA 2000 1x, CDMA 2000 1x-EVDO) communication system or alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA) OFDM (Orthogonal Frequency Division Multiplexing) or OFDMA (Orthogonal Frequency Division Multiple Access) systems, 802.xx systems, or in general any wireless communication system employing a combination of techniques. The encoded frames are transmitted (Tx) over network 140. The encoding processes performed by encoder device 105 are more fully described below.

Decoder device 110 contains complementary components to encoder device 105, including, intra decoding component 145, predictive decoding component 150, temporal scalability component 155, memory component 160 and communications component 180. Decoder device 110 receives encoded data that has been transmitted over network 140 or from external storage 165. Communications component 180 contains logic used for receiving (Rx) encoded data in conjunction with network 140, as well as logic for receiving encoded data from external storage 165. External storage 165 could be, for example, external RAM or ROM, or a remote server. Intra decoding component 145 is used to decode intra-coded data. Predictive decoding component 150 is used to decode inter-coded data. Predictive decoding component decodes both P frames (forward or backward predicted) as well as B frames. The same sub-components used for decoding P frames can be utilized in series to decode B frames with multiple references. Multiple references for B frames can be in forward and backward reference frames, both in the same reference frame, both in separate forward reference frames or both in backward reference frames.

Temporal scalability component 155 contains logic used for decoding the overhead information, including the macroblock map discussed above, and translating this information so that intra decoding component 145 and predictive decoding component 150 can decode the appropriate macroblocks in the appropriate way. The translating of information can include enabling the use of sub-components of the predictive decoding component twice in series for decoding B frames (or slices or other portions of frames that are predicted from multiple references). Temporal scalability component 155 also contains logic used to skip decoding of enhancement layer data including bi-directionally predicted frames and/or low priority video data. Decoding of enhancement layer data can be skipped if, for example, the enhancement layer data is not received or received with poor or insufficient SNR, and/or if there is insufficient processing power at the decoder device. After decoding, the decoded frames can be displayed with display component 170 or stored in internal memory 160 or external storage 165. Display component 170 can be an integrated part of the decoding device that contains such parts as video display hardware and logic, including a display screen, or it can be an external peripheral device. The decoding processes performed by decoder device 110 are more fully described below.

Figure 2A:
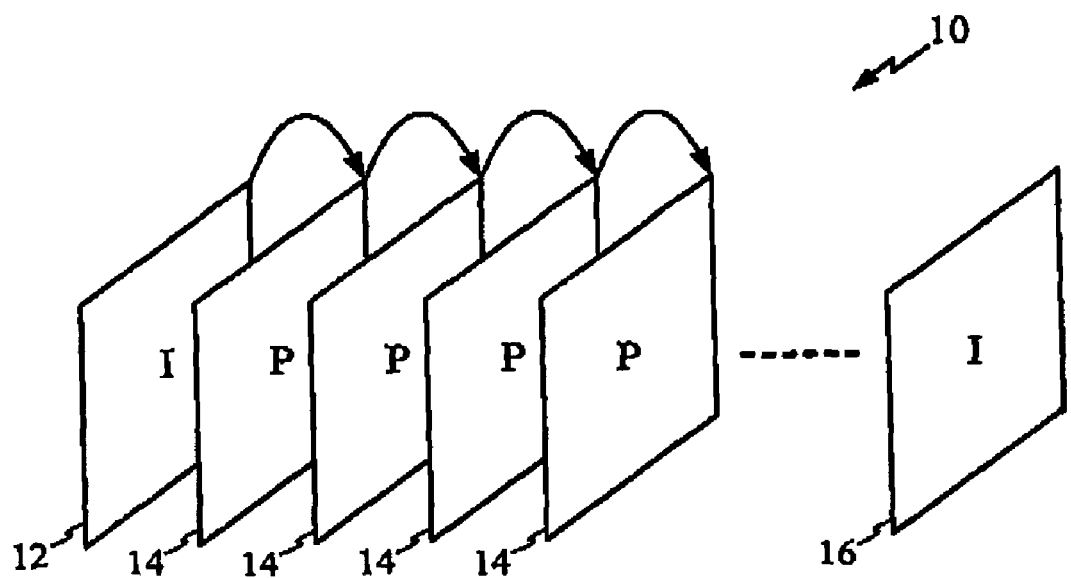
FIG. 2A is a diagram illustrating a conventional MPEG-4 Simple Profile data stream.

In a typical MPEG decoder, predictive coded pixel blocks (i.e., blocks that comprise one or more motion vectors and a residual error component) are decoded with respect to a reference frame (where an intra-frame or another predicted frame can serve as a reference frame). FIG. 2A is a diagram illustrating a conventional MPEG-4 Simple Profile data stream, which depicts frame dependencies for a GOP. GOP 10 is made up of initial I Frame 12, followed by several forward predicted P frames 14. The dependency of P frames on a previous I or P frame can limit the temporal scalability afforded to a system (systems such as those conforming to the MPEG-4 Simple and H.264 Baseline Profiles) that may only support forward predicted frames. Removing any of the P frames 14 may result in a loss of information that may be crucial in decoding other P frames. P frame removal may result in, for example, video jitter or the inability of the decoder to continue decoding until the next I frame 16, which marks the beginning of the next GOP.

Figure 2B:
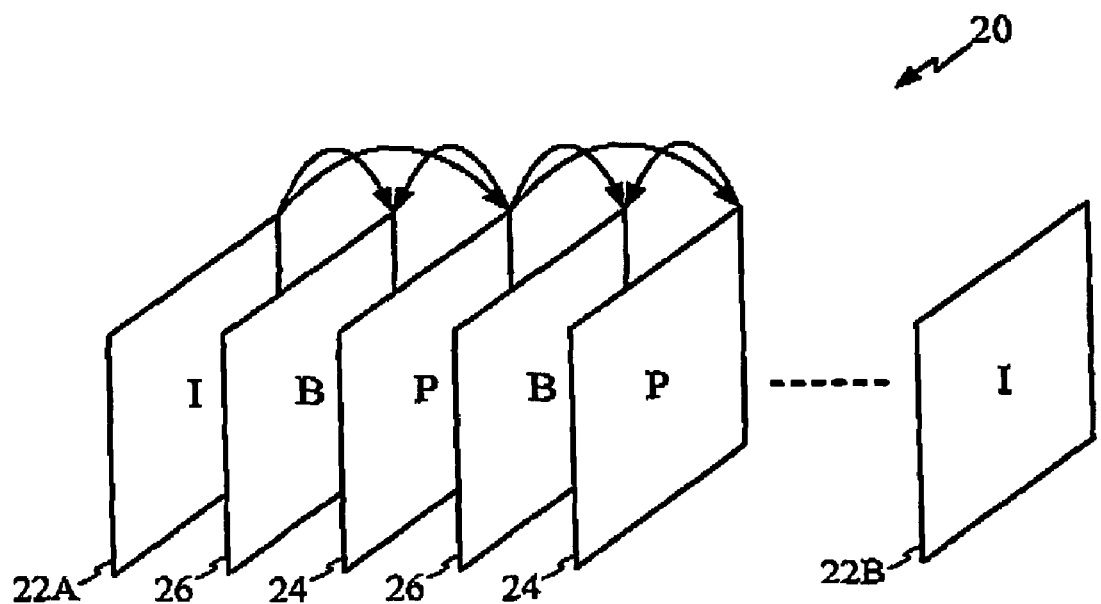
FIG. 2B is a diagram illustrating a conventional encoded data stream that enables temporal scalability.

Use of bi-directional predicted data in an enhancement layer of a scalable video coding system could be useful in dynamic channels as discussed above. FIG. 2B is a diagram illustrating a conventional encoded data stream that enables temporal scalability, which depicts the frame dependencies of a GOP. GOP 20 is made up of I frame 22A, forward predicted P frames 24, and bi-directional predicted B frames 26. Each B frame can combine forward and backward motion vectors and residual errors referenced to I frame 22A or forward predicted P frames 24 (backward predicted P frames could also be used but are not shown in this example). I frame 22B marks the beginning of the next GOP. As shown in FIG. 2B, only one B frame 26 is contained between I frame 22A and P frame 24 or between two P frames 24. Several B frames could be inserted between reference frames to allow for greater flexibility in temporal scalability. Since no other frames may depend on the B frame as a reference frame, one could remove B frames 26 without loss of information regarding the decoding of other frames. This characteristic of B frames 26 can allow B frames 26 to be inserted into a bitstream, where the B frames 26 can be removed at the option of an encoder, a transcoder or a decoder to accommodate channel conditions, bandwidth limitations, battery power as well as other considerations. For example, if there are three B frames between reference frames, then one could remove all three B frames and reduce the frame rate by three quarters or one could keep the B frame in the middle and remove the other two to reduce the frame rate by one half. The data rate could decrease accordingly.

Figure 3:
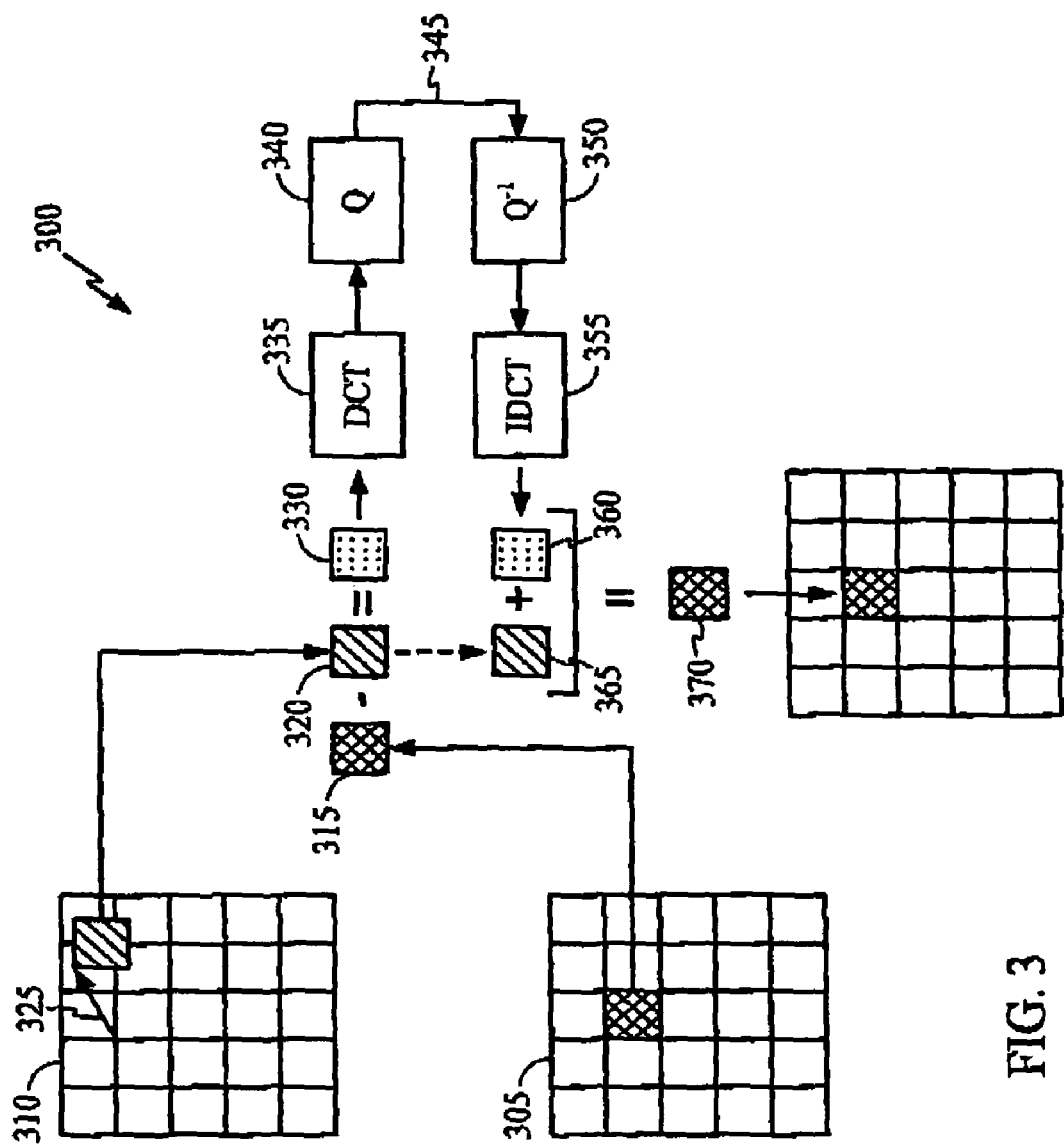
FIG. 3 is an illustration of an example of a P Frame construction process in MPEG-4.

P Frames (or any inter-coded sections) can exploit temporal redundancy between a region in a current picture and a best matching prediction region in a reference picture. The difference between the current region and the best matching reference prediction region is known as residual error (or prediction error). The location of the best matching prediction region in the reference frame can be encoded in a motion vector. FIG. 3 is an illustration of an example of a P Frame construction process in, for example, MPEG-4. Process 300 includes current picture 305 made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled, or decimated, by 2 in the X and the Y directions. Hence, each macroblock would consist of 256 Y components, 64 Cr components and 64 Cb components. Macroblock 315 of current picture 305 is predicted from reference picture 310 at a different time point than current picture 305. A search is made in reference picture 310 to locate best matching macroblock 320 that is closest, in terms of Y, Cr and Cb values to current macroblock 315 being encoded. Methods of searching for best matching macroblock 320, known by those of ordinary skill in the art, include a) minimizing SAD (sum of absolute pixel differences) between current macroblock 315 and reference picture 310 macroblocks, b) minimizing SSD (sum of squared pixel differences), and c) minimum cost in a rate distortion sense, and others. The location of best matching macroblock 320 in reference picture 310 is encoded in motion vector 325. Reference picture 310 can be an I Frame or P Frame that the decoder will have reconstructed prior to the construction of current picture 305. Best matching macroblock 320 is subtracted from current macroblock 315 (a difference for each of the Y, Cr and Cg components is calculated) resulting in residual error 330. Residual error 330 is encoded with 2D Discrete Cosine Transform (DCT) 335 and then quantized 340. Quantization 340 can be performed to provide spatial compression by, for example, allotting fewer bits to the high frequency coefficients while allotting more bits to the low frequency coefficients. The quantized coefficients of residual error 330, along with motion vector 325 and reference picture 310 identifying information, are encoded information representing current macroblock 315. The encoded information can be stored in memory for future use or operated on for purposes of, for example, error correction or image enhancement, or transmitted over network 345.

The encoded quantized coefficients of residual error 330, along with encoded motion vector 325, can be used to reconstruct current macroblock 315 in the encoder for use as part of a reference frame for subsequent motion estimation and compensation. The encoder can emulate the procedures of a decoder for this P Frame reconstruction. The emulation of the decoder will result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 350 and then 2D Inverse DCT, or IDCT, 355 is performed resulting in decoded or reconstructed residual error 360. Encoded motion vector 325 is used to locate the already reconstructed best matching macroblock 365 in the already reconstructed reference picture 310. Reconstructed residual error 360 is then added to reconstructed best matching macroblock 365 to form reconstructed macroblock 370. Reconstructed macroblock 370 can be stored in memory, displayed independently or in a picture with other reconstructed macroblocks, or processed further for image enhancement.

B Frames (or any section coded with bi-directional prediction) can exploit temporal redundancy between a region in a current picture and a best matching prediction region in a previous picture and a best matching prediction region in a subsequent picture. The subsequent best matching prediction region and the backward best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

Figure 4:
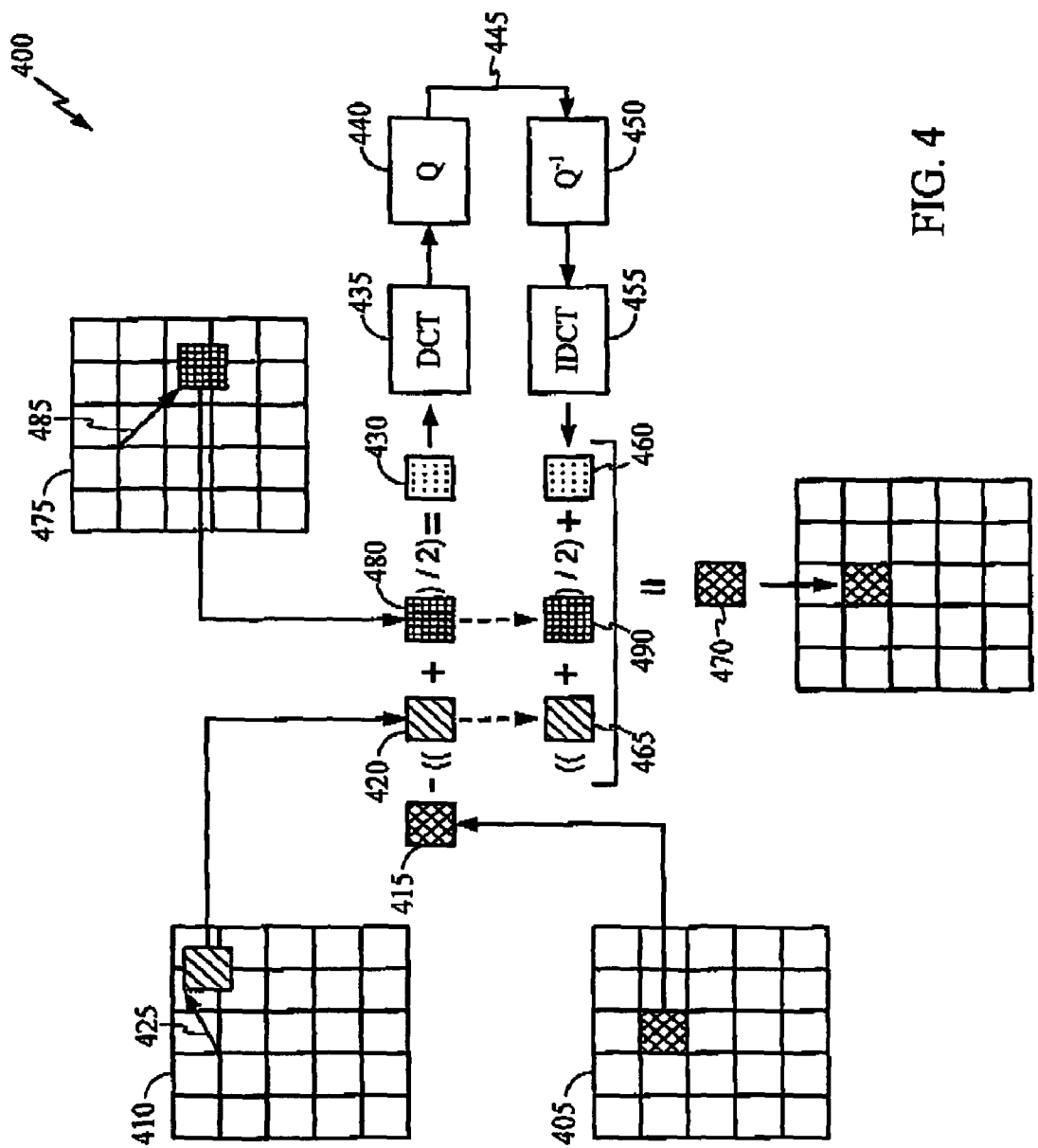
FIG. 4 is an illustration of an example of a B Frame construction process in MPEG-4.

FIG. 4 is an illustration of an example of a B Frame construction process in, for example, MPEG-4. Process 400 includes current picture 405 made up of 5×5 macroblocks, where the number of macroblocks in this example is arbitrary. Encoding macroblock 415 of current picture 405 is done in reference to previous reference picture 410 at a previous time point than current picture 405 and in reference to subsequent reference picture 475 at a subsequent time point. A search is made in previous reference picture 410 to locate best matching macroblock 420 that is closest to current macroblock 415 being encoded. The location of best matching macroblock 420 is encoded in motion vector 425. Previous reference picture 410 can be an I Frame or P Frame that the decoder will have reconstructed prior to the construction of current picture 405. A search is made in subsequent reference picture 475 to locate best matching macroblock 480 that is closest to current macroblock 415. The location of best matching macroblock 480 is encoded in motion vector 485. Subsequent reference picture 475 can be an I Frame or P Frame that the decoder will have reconstructed prior to the construction of current picture 405. Best matching macroblock 420 and best matching macroblock 480 are averaged to form a combined bi-directional macroblock that is subtracted from current macroblock 415 resulting in residual error 430.

Other methods of combining the best matching macroblocks are discussed below. Residual error 430 is encoded with, for example, DCT 435 (other 2D transforms include a Hadamard transform or an integer transform as in H.264) and then quantized 440. The quantized coefficients of residual error 430, along with motion vectors 425 and 485 and reference picture identifying information, are encoded information representing current macroblock 415. The encoded information can be stored in memory for future use or operated on for purposes of, for example, error correction or image enhancement, or transmitted over network 445.

Since a B Frame is not used as a reference frame, in order to retain its temporal scaling property, macroblock reconstruction for B Frames may not be needed in an encoder. In a decoder, reconstruction of a B Frame section can be started after both the previous reference frame (or a portion of a picture or frame that is being referenced) and the subsequent reference frame (or a portion of a picture or frame that is being referenced) are reconstructed. The encoded quantized coefficients are dequantized 450 and then 2D IDCT 455 is performed resulting in decoded or reconstructed residual error 460. Encoded motion vectors 425 and 485 are used to locate the already reconstructed best matching macroblock 465 in the already reconstructed previous reference frame 410, and to locate the already reconstructed best matching forward macroblock 490 in subsequent reference frame 475. Reconstructed best matching macroblocks 465 and 490 are averaged to form a combined bi-directional macroblock. Reconstructed residual error 460 is then added to the combined bi-directional macroblock to form reconstructed macroblock 470. Reconstructed macroblock 470 can be stored in memory, displayed independently or in a picture with other reconstructed macroblocks, or processed further for image enhancement.

Figure 5:
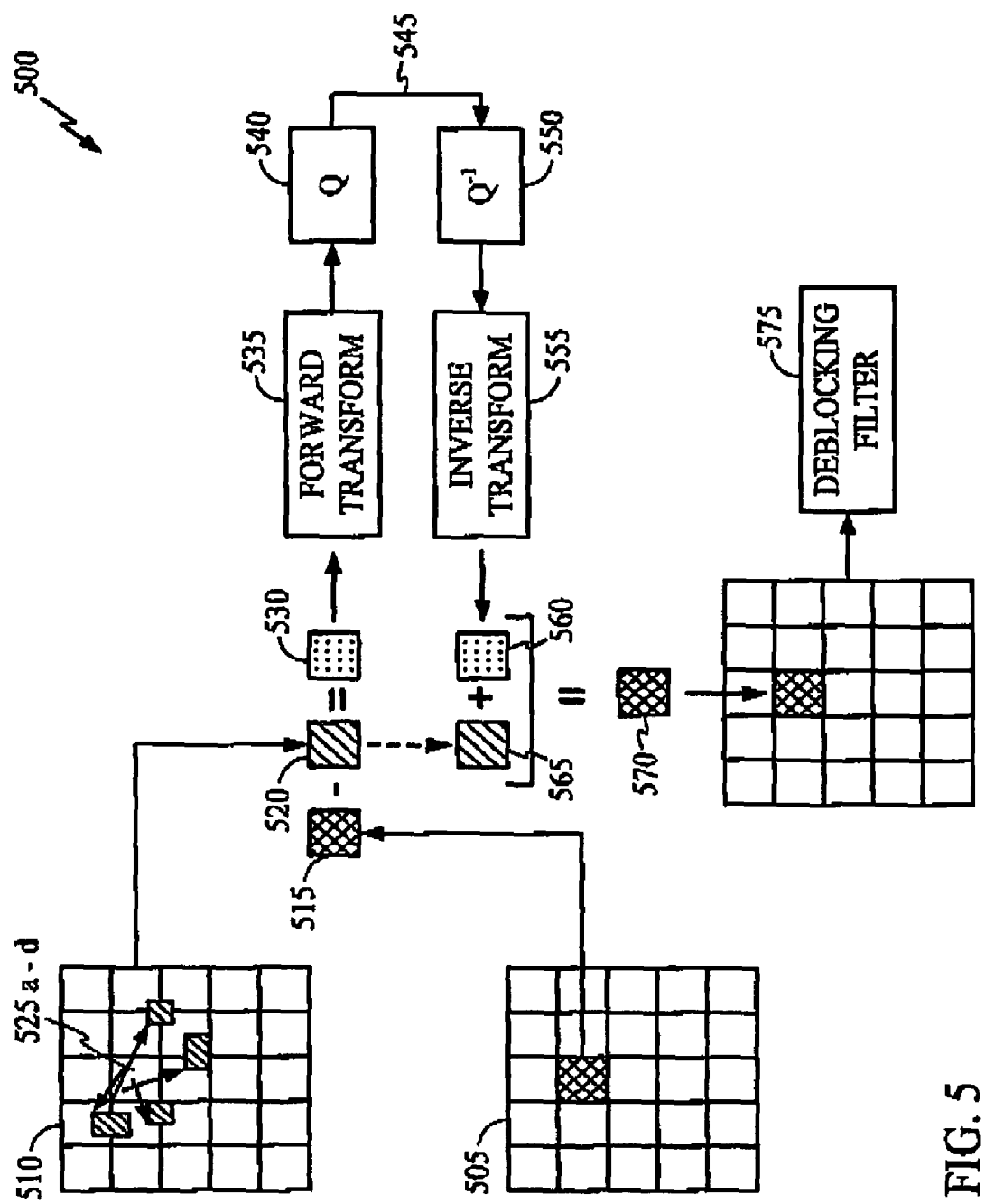
FIG. 5 is an illustration of an example of a P Frame construction process in H.264.

H.264 offers some options to the MPEG-4 examples of P Frame construction and B Frame construction discussed above. FIG. 5 is an illustration of an example of a P Frame construction process in H.264. Process 500 includes current picture 505 made up of 5×5 macroblocks, where the number of macroblocks in this example is arbitrary. Macroblock 515 of current picture 505 is predicted from reference picture 510 at a different time point than current picture 505. A macroblock can be divided into smaller sub-macroblock sections (for example, four sub-macroblocks are depicted in this example, but H.264 allows for sub-macroblock partitions as small as 4×4 pixels. Hence there can be 16 motion vectors for a single macroblock) and each sub-macroblock section can be exploited separately for temporal redundancy. A search is made in the reference picture to locate best matching sub-macroblocks for each sub-macroblock resulting in composite best matching macroblock 520 that is closest to current macroblock 515 being encoded. The location of the best matching macroblocks in the reference picture can be encoded in four motion vectors 525*a*-525*d*. The reference picture can be an I Frame or P Frame that the decoder will have reconstructed prior to the construction of current picture 505. The composite best matching macroblock 505 is subtracted from current macroblock 515 resulting in residual error 530. Residual error 530 can be encoded with slightly different forward 2D transform 535 than the DCT used in MPEG-4 and then quantized 540. The quantized coefficients of residual error 530, motion vectors 525*a*-525*d* and reference frame identifying information, are encoded information representing current macroblock 515. The encoded information can be stored in memory for future use or operated on for purposes of, for example, error correction or image enhancement, or transmitted over network 545.

The encoded quantized coefficients, motion vector, weights and residual error can also be used to reconstruct the current macroblock in the encoder for use as part of a reference frame for subsequent motion estimation and compensation. The encoder can emulate the procedures of a decoder for this P Frame reconstruction. The emulation of the decoder will result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 550 and then 2D Inverse Transform 555 is performed resulting in a decoded or reconstructed residual error 560. The encoded motion vectors 525*a*-525*d* are decoded and used to locate the already reconstructed best matching sub-macroblocks that make up reconstructed best matching composite macroblock 565. Reconstructed residual error 460 is then added to reconstructed best matching composite macroblock 560 to form reconstructed macroblock 570. Deblocking filter 575 can also be used as part of the encoding or decoding process for pixel enhancement such as, along the edges of the macroblocks or sub-macroblocks. The reconstructed macroblock can be stored in memory, displayed independently or in a picture with other reconstructed macroblocks, or processed further for image enhancement. Those of ordinary skill in the art will recognize that B Frame construction in H.264 can also utilize multiple sub-macroblocks using similar methods.

In the case of H.264, B Frame construction can be done on the slice level (a slice is usually a contiguous group of macroblocks) or picture level where different slices or pictures in the B Frame can be either intra-coded or inter-coded down to 4×4 pixel blocks. H.264 also provides for direct mode bi-directional prediction. In direct mode, the forward and backward motion vectors are derived from a motion vector used in a co-located macroblock of one of the two reference frames. In direct mode, the derivation of the forward and backward motion vectors is based on the temporal distance between the backward and forward reference frames and the current B frame or picture. The direct mode also enables weighting of the reference macroblocks Y, Cr and Cb components instead of averaging as was presented in the example in FIG. 3. The weighting is also based on the temporal distance between the backward and forward reference frames and the current B frame or picture. In addition, B Frame construction could compute the residual error based on either the forward or backward best matching macroblock alone, instead of the average macroblock as is depicted in FIG. 3.

Figure 6:
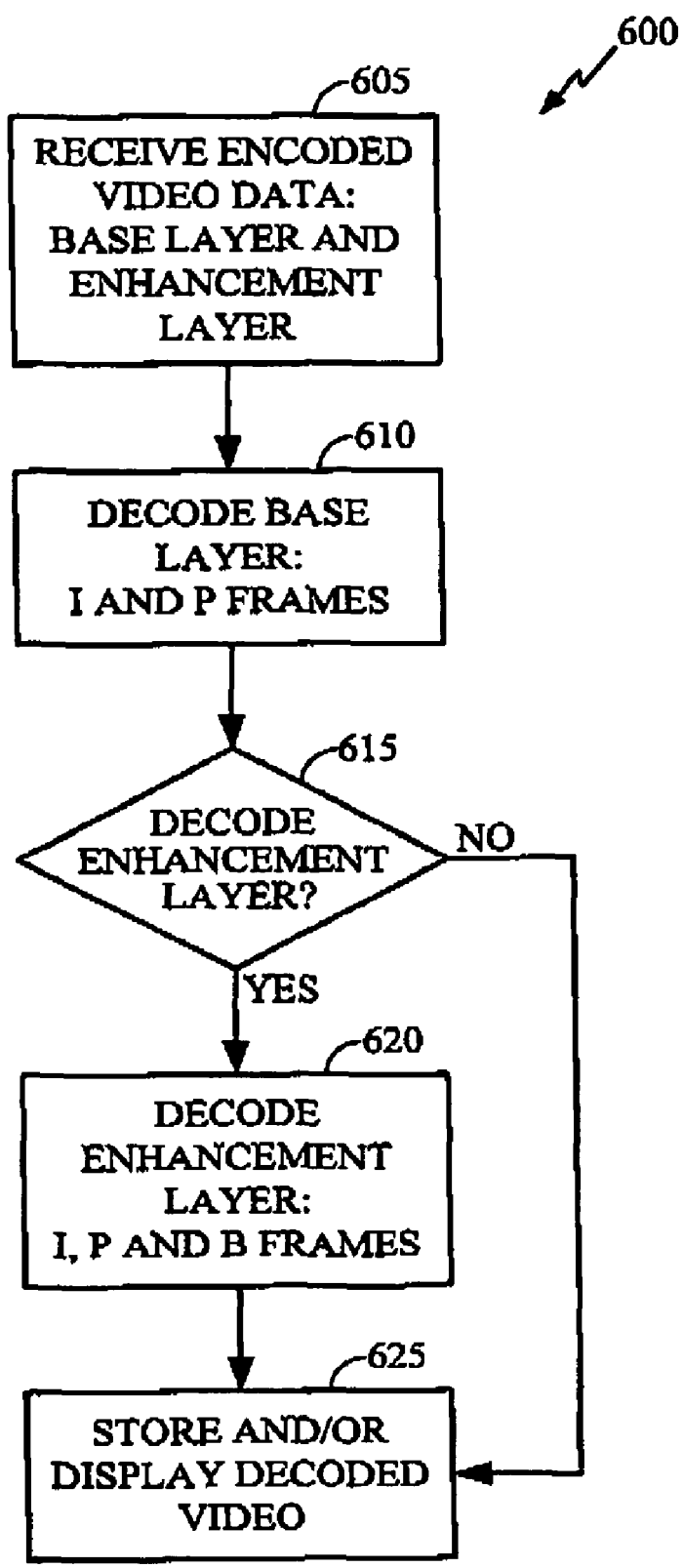
FIG. 6 is a flowchart illustrating one example of a decoding process including temporal scalability.

FIG. 6 is a flowchart illustrating one example of an decoding process including temporal scalability. Process 600 carried out by a device such as decoder device 110 in FIG. 1. Encoded video data is received by the decoder device over a network such as network 140 in FIG. 1, or received from external storage such as external storage component 165 in FIG. 1, step 605. The encoded data includes base layer and enhancement layer data as described above. Receiving means, such as communications component 180 in FIG. 1, can perform step 605. The decoder device decodes the base layer data which can include both I and P frames. Decoding means, such as intra decoding component 145 and predictive decoding component 150 of FIG. 1, can perform step 610. The decoder device determines whether or not to decode enhancement layer data, step 615. Reasons for not decoding the enhancement layer include, for example, the enhancement layer data is not received or received with poor or insufficient SNR, and/or if there is insufficient processing power at the decoder device. Decision block 615 can be performed on any level to omit decoding portions of any size including entire frames, slices, macroblocks and smaller portions. If the decision of step 615 was to decode the enhancement layer, then the decoder device decodes the enhancement layer data including I, P and B frames, step 620. Determining means, such as temporal scalability component 155 of FIG. 1, can perform step 615. Decoding means, such as intra decoding component 145 and predictive decoding component 150 of FIG. 1, can perform step 620. After all base layer and enhancement layer data that the decoder chose to decode have been decoded, the decoder can store the decoded video into memory or display the video, step 625. Storing means, such as external storage component 165 or memory component 160 in FIG. 1, can perform the store portion of step 625. Displaying means, such as display component 170 of FIG. 1, can perform the display portion of step 625.

Figure 7:
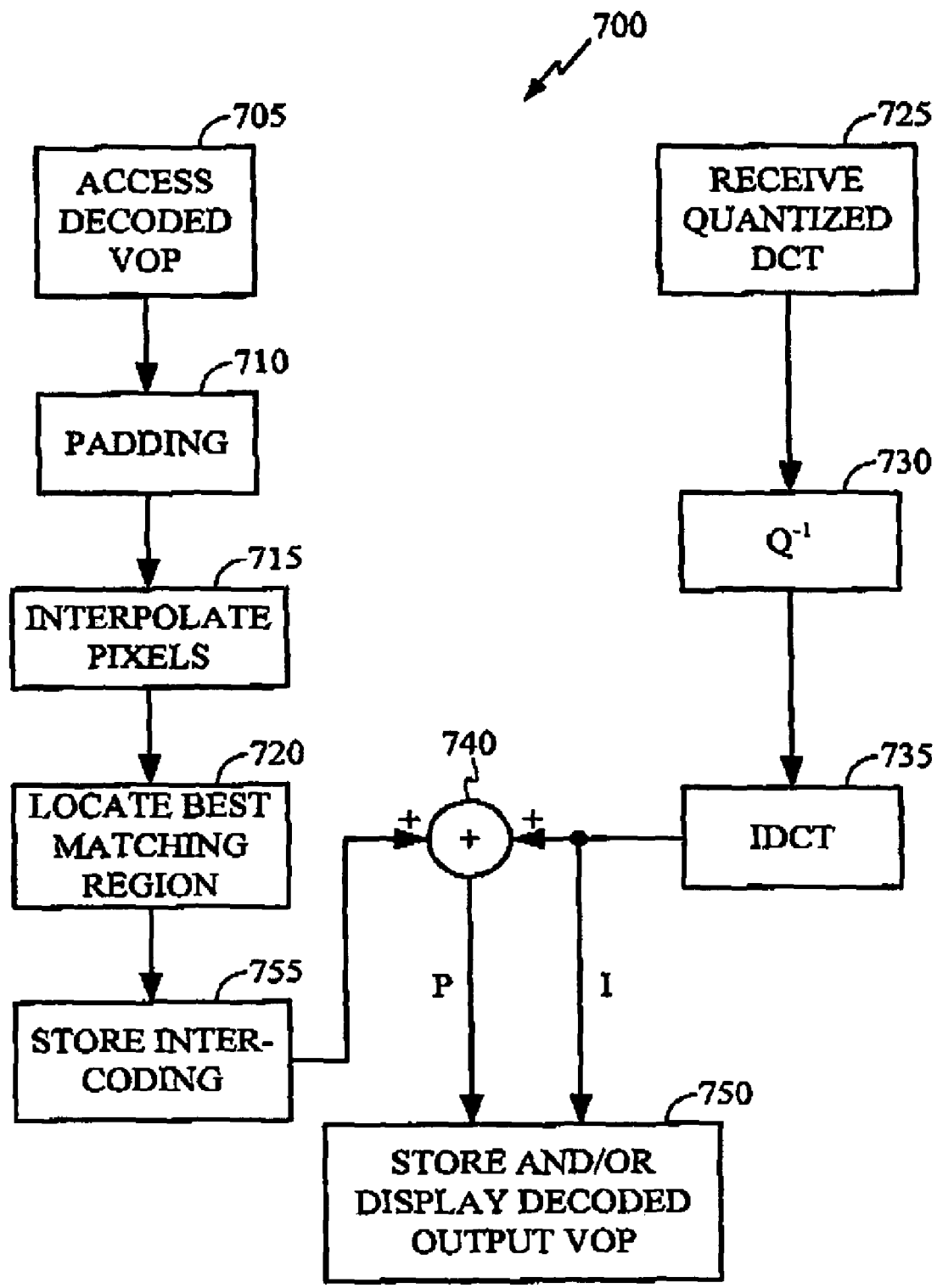
FIG. 7 is a flow chart illustrating one example of a motion compensation codec process for base layer I and P Frame construction.

FIG. 7 is a flow chart illustrating one example of a motion compensation codec process for base layer I and P Frame construction, as performed in step 610 in FIG. 6. The base layer of a scalable video coded bitstream can contain high priority data. Some low bit rate remote devices may only have base layer capability. Decoder process 700 starts decoding an I Frame by receiving the encoded quantized intra-coded video data over a network or from memory, step 725. Receiving means such as communications component 180 in FIG. 1 can perform step 725. The quantized intra-coded video data is dequantized, step 730. The data is then inverse transformed, step 735, resulting in a decoded I Frame. The decoded I Frame or I-VOP (I-VOP stands for Intra-coded Video Object Plane) is then ready to be displayed and/or stored in memory, step 750. The decoder can also store the decoded output I-VOP into memory for decoding a subsequent P frame that references the I Frame.

P Frame decoding can only start after the reference frame, from which the P frame is predicted, is decoded. The decoded reference VOP is accessed from memory, step 705. The VOP border edges are padded with zeroes, step 710, in preparation for pixel interpolation. Padding with zeroes allows for multiple tapped filters to correctly interpolate between border area pixels where an insufficient number of pixels exist. The padded VOP pixels are interpolated, step 715. Pixel interpolation is used to achieve better matching reference regions for motion compensation. Pixel interpolation will be discussed in more detail below. After the pixels are interpolated, the codec locates the best matching reference macroblock (or any size section) within the interpolated pixels with an encoded motion vector, step 720. After all the inter-coded macroblocks have been located with motion vectors and partially reconstructed from the reference frame, the partially reconstructed P Frame is stored in memory, step 755. Similar to the discussion above with respect to I frames, the quantized DCT coefficients of the residual error portion of the P Frame are received over the network or from memory, step 725. The residual error is dequantized, step 730, and inverse transformed, step 735. The decoded residual error is added, step 740, to the partially reconstructed stored P Frame resulting in the decoded output P-VOP. The decoded P-VOP can be stored into memory and/or displayed, step 750.

Figure 8:
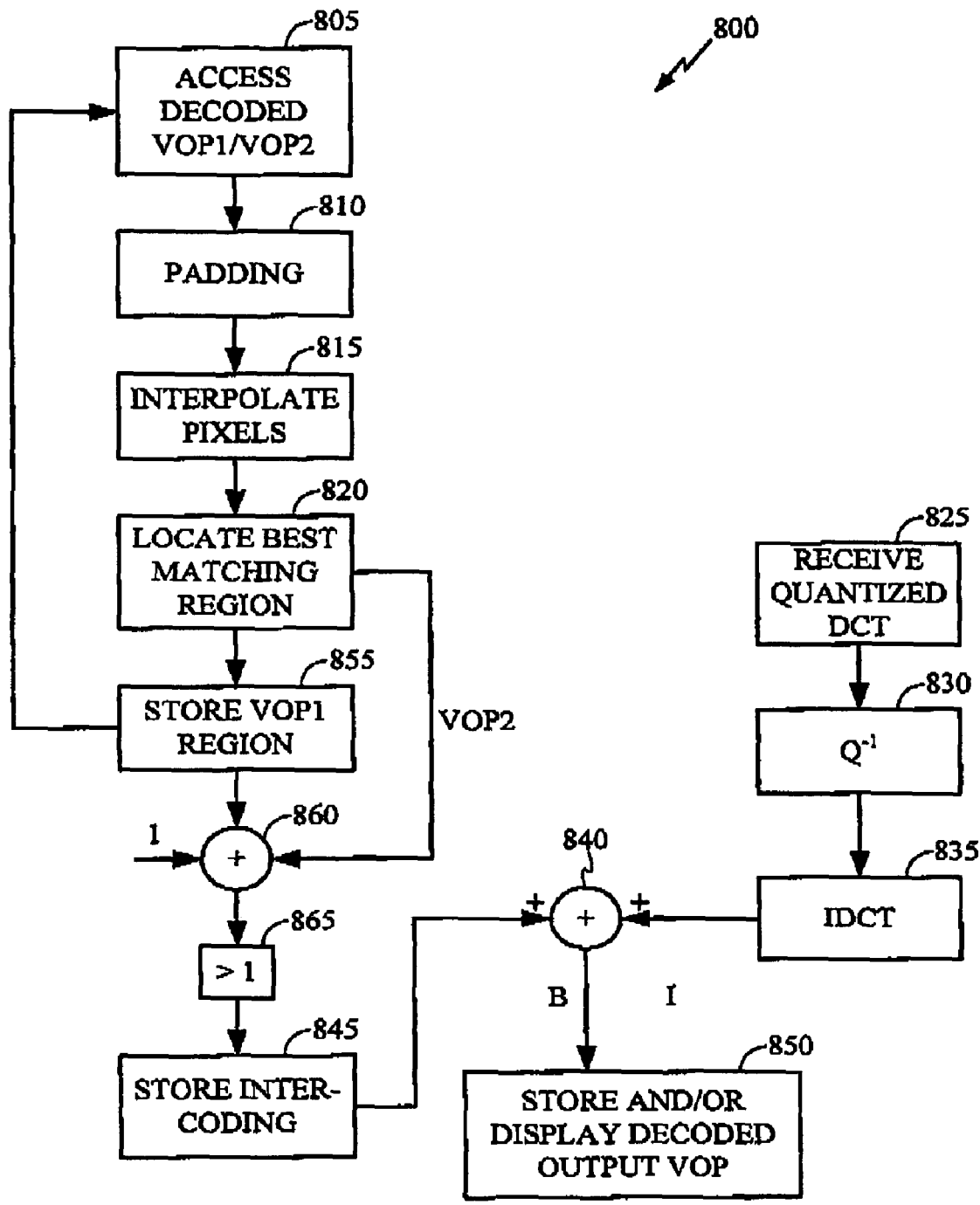
FIG. 8 is a flow chart illustrating one example of a motion compensation codec process for enhancement layer B Frame construction.

Process 700 is used in the same way as discussed above to decode enhancement layer I an P frames as in step 620 of FIG. 6. However, decoding enhancement layer B Frames in step 620 utilizes two reference frames, such as one previous I or P frame and one subsequent I or P frame. FIG. 8 is a flow chart of an example of an enhancement layer B Frame construction process that utilizes components of the base layer motion compensation codec used to perform the base layer process shown in FIG. 7. This exemplary embodiment reuses the base layer components, with little or no modification to the base layer components and a small amount of additional software, firmware or hardware changes, for the purpose of constructing a bi-directional picture or B Frame. B Frame construction starts by accessing a first decoded VOP1, step 805. VOP1 border edges are padded with zeroes, step 810. The pixels of the padded VOP1 are interpolated, step 815. An encoded motion vector is used to locate a best matching region in VOP1, step 820. VOP1 can be assumed to be a backward located reference frame without loss of generality. The best matching macroblock from the VOP1 is stored in memory for combining with the second VOP best matching macroblock, step 855. Step 855 may require a second memory buffer for storing the best matching region of VOP1 that an unmodified base layer codec does not require. Steps 805, 810, 815 and 820 are repeated for VOP2. To be able to access the second frame stored in memory may require a second area of memory that the base-layer codec did not require. The same base layer modules that were used for padding, and interpolating pixels, and locating the best matching region of VOP1 are re-used for VOP2.

Reusing modules can add delay in the encoding/decoding process since only one module is available at any one time, but if the delay is acceptable, the cost savings can be a larger benefit. The best matching macroblock from VOP2 is then added, step 860 while also adding a "1" for rounding control, to the stored best matching macroblock of VOP1 resulting in a combined best matching macroblock. The combined best matching macroblock is then divided by two to average the pixel values (shown as a right bit shift of 1), step 865. The averaged combined best matching macroblock is then stored in memory, step 845. Steps 805, 810, 815, 820, 855, 860, 865 and 845 can be continued until the entire partially reconstructed B-VOP is completed. As with the base layer P-VOP reconstruction discussed above, the residual error for the B-VOP is received over a network or from memory, dequantized at step 830, and inverse transformed at step 835. The residual error is then added, step 840, to the stored partially reconstructed B-VOP resulting in a decoded B-VOP. The decoded B-VOP is then stored in memory or displayed, step 850.

FIG. 8 shows steps 805, 810, 815 and 820 being performed one after the other in a first pass, and then the entire set of steps is repeated in series in a second pass. As one of ordinary skill in the art will recognize, multiple processing threads can be occurring simultaneously in a processor. With multiple processing threads, one module, such as a motion compensation module, can be working on the first reference frame or a block therefrom while another module, such as the inverse quantization and inverse transform module is processing the second reference frame or a block therefrom. Once the modules complete their operations they switch frames or blocks, such that the motion compensation module works on the second reference frame and the inverse quantization and inverse transform module is processing the next reference frame. This type of multi-thread processing can reduce the computational delay caused by re-using modules.

Reuse of base layer decoding components for decoding bi-directionally predicted portions could require certain restrictions. For P-frames, one set of motion vectors (up to sixteen per macroblock for 4×4 pixel partitioning in H.264) and one reference picture index is communicated between these components. For B-frames, in order to use the same interface, encoding is restricted to eight partitions (each with two motion vectors) per macroblock. Simulations have shown that sixteen 4×4 pixel partitions in B-frames occur at a negligible probability and the impact on bit-rate and quality is unperceivable due to such a restriction. Also, limiting encoding to eight partitions does not imply that 4×4 block partitions cannot be handled. The restriction is only on the number of motion vectors per macroblock. For example a macroblock partitioned into four 4×4 blocks and three 8×8 pixel blocks is a valid combination. Alternatively to restricting the encoding, the decoder can utilize a mode provided for by H.264 where groups of four 4×4 blocks are combined to form an 8×8 block and one of the 4 motions vectors (of the 4×4 blocks) is used as the motion vector for the combined 8×8 pixel block.

The motion compensation codec can perform the padding, fractional pixel interpolation and best matching region location in series if the computational capability of the processor(s) is sufficient. In particular, simulations have shown that the computational load (particularly, number of cycles spent on motion compensation for the entire frame) of decoding a B-frame is less than that for a P-frame. Hence even if the padding, interpolation and best matching region location occur in series, a frame can still be decoded to meet playback frame rates up to 30 frames per second and above (a frame must be decoded in [1/(frame rate in fps)] seconds).

Figure 9:
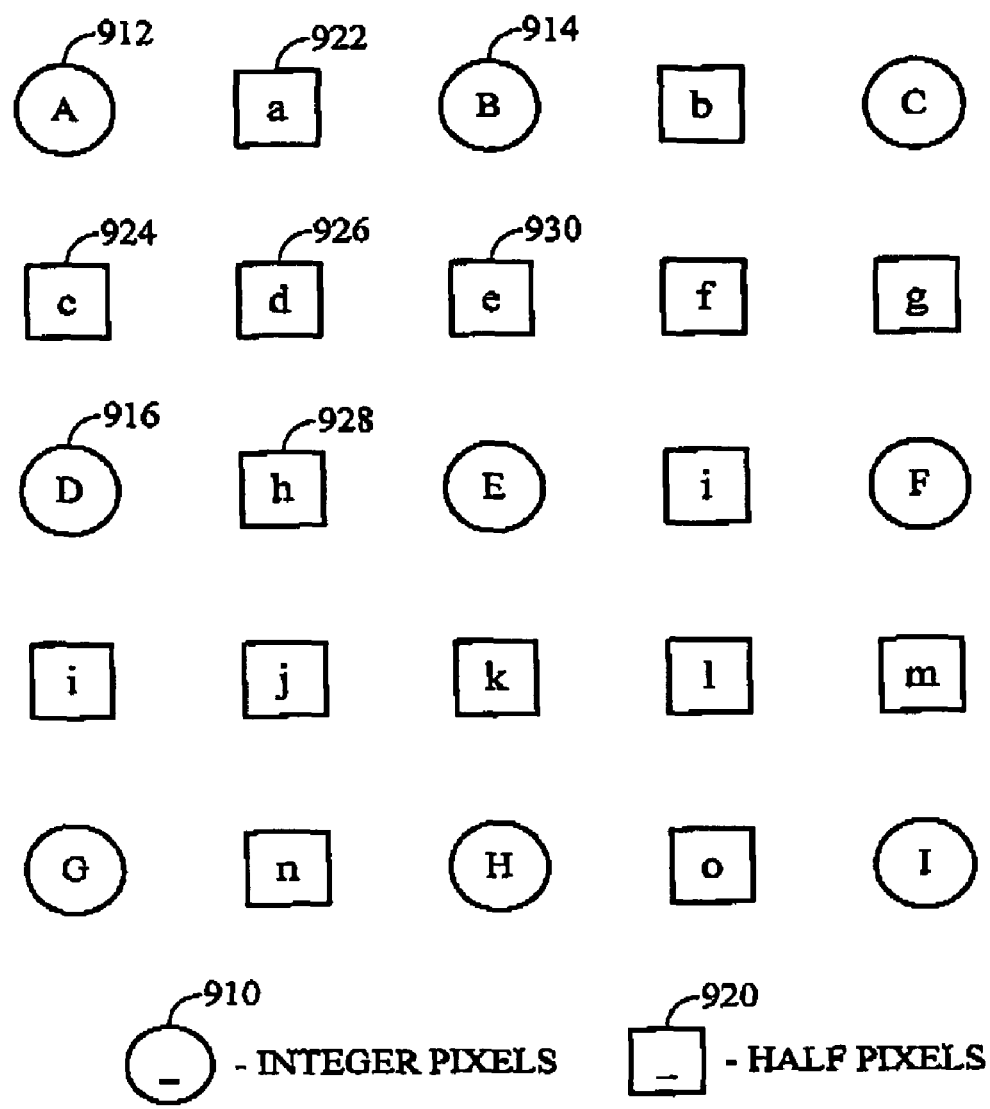
FIG. 9 is an illustration of an example of half-pixel interpolation for use in motion compensation.

Pixel interpolation can be used to improve the performance of motion compensated predictive coding. FIG. 9 is an illustration of an example of half-pixel interpolation for use in motion compensation. The example shown is half pixel interpolation where one interpolated pixel is located between each of the original integer pixels. Integer pixels 910 are depicted as circles labeled upper case "A" to "I" and the interpolated or half-pixels 920 are depicted as squares labeled lower case "a" to "o". Half pixel interpolation can be carried out with a bilinear filter such as, for example, a 2-tap FIR filter with weights [0.5 0.5]. For example, interpolated pixel 922 can be calculated as the average of integer pixel 912 and integer pixel 914, interpolated pixel 924 can be the average of integer pixel 912 and integer pixel 916, and interpolated pixel 926 can be the average of two interpolated pixels (for example, 922 and 928 or 924 and 930). Both the luminance (Y) and chrominance (Cr and Cb) components can be interpolated in this fashion. Other orders of pixel interpolation are supported by various standards. H.264 supports quarter pixel interpolation as well as eighth pixel interpolation. Those of ordinary skill in the art would understand these other pixel interpolation methods and they are not discussed in greater detail herein.

Examples of the methods and apparatus described above include:

A method for decoding a bi-directional picture with a motion compensation codec that is capable of locating reference frame portions from only one reference frame at a time, comprising: locating a first reference frame portion from a first reference frame in a first pass, storing the first reference frame portion in memory, locating a second reference frame portion from a second reference frame in a second pass, and combining the first reference frame portion and the second reference frame portion to form a bi-directionally predicted portion.

An apparatus for decoding a bi-directional picture with a motion compensation codec that is capable of locating reference frame portions from only one reference frame at a time, comprising: means for locating a first reference frame portion from a first reference frame in a first pass, means for storing the first reference frame portion in memory, means for locating a second reference frame portion from a second reference frame in a second pass, and means for combining the first reference frame portion and the second reference frame portion to form a bi-directionally predicted portion.

An electronic device for decoding a bi-directional picture with a motion compensation codec that is capable of locating reference frame portions from only one reference frame at a time, the electronic device configured to locate a first reference frame portion from a first reference frame in a first pass, to store the first reference frame portion in memory, to locate a second reference frame portion from a second reference frame in a second pass, and to combine the first reference frame portion and the second reference frame portion to form a bi-directionally predicted portion.

A computer readable medium having instructions for causing a computer to execute a method for decoding a bi-directional picture with a motion compensation codec that is capable of locating reference frame portions from only one reference frame at a time, comprising: locating a first reference frame portion from a first reference frame in a first pass, storing the first reference frame portion in memory, locating a second reference frame portion from a second reference frame in a second pass, and combining the first reference frame portion and the second reference frame portion to form a bi-directionally predicted portion.

A method for encoding a bi-directional picture predicted from two reference frames to be decoded by a motion compensation codec that is capable of locating reference frame portions from only one reference frame at a time and is capable of decoding a limited number of partitions for each macroblock, comprising: partitioning a macroblock of the bi-directional picture into a plurality of sub-macroblocks, locating a predicted region in each of the two reference frames for each of the sub-macroblocks, and limiting the number of sub-macroblocks to a number that is no more than half of the limited number of partitions that the motion compensation codec is capable of decoding.

An apparatus for encoding a bi-directional picture predicted from two reference frames to be decoded by a motion compensation codec that is capable of locating reference frame portions from only one reference frame at a time and is capable of decoding a limited number of partitions for each macroblock, comprising: means for partitioning a macroblock of the bi-directional picture into a plurality of sub-macroblocks, means for locating a predicted region in each of the two reference frames for each of the sub-macroblocks, and means for limiting the number of sub-macroblocks to a number that is no more than half of the limited number of partitions that the motion compensation codec is capable of decoding.

An electronic device for encoding a bi-directional picture predicted from two reference frames to be decoded by a motion compensation codec that is capable of locating reference frame portions from only one reference frame at a time and is capable of decoding a limited number of partitions for each macroblock, the electronic device configured to partition a macroblock of the bi-directional picture into a plurality of sub-macroblocks, to locate a predicted region in each of the two reference frames for each of the sub-macroblocks, and to limit the number of sub-macroblocks to a number that is no more than half of the limited number of partitions that the motion compensation codec is capable of decoding.

A computer readable medium having instructions for causing a computer to execute a method for encoding a bi-directional picture predicted from two reference frames to be decoded by a motion compensation codec that is capable of locating reference frame portions from only one reference frame at a time and is capable of decoding a limited number of partitions for each macroblock, comprising: partitioning a macroblock of the bi-directional picture into a plurality of sub-macroblocks, locating a predicted region in each of the two reference frames for each of the sub-macroblocks, and limiting the number of sub-macroblocks to a number that is no more than half of the limited number of partitions that the motion compensation codec is capable of decoding.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed methods and apparatus.

Thus, a method, apparatus and system to provide scalable video coded data, via bi-directional prediction, based on a base layer non-scalable coding design with minimal change to the base layer software, firmware and hardware, have been described.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

The invention claimed is:

1. A method for decoding an enhancement-layer bi-directional frame, comprising:
   receiving an enhancement layer bi-directional frame comprising a set of motion vectors;
   using base layer components of a motion compensation codec to perform the steps of:
      locating a first reference frame portion from a first reference frame in a first pass using a first motion vector from the set of motion vectors;
      storing the first reference frame portion in memory;
      locating a second reference frame portion from a second reference frame in a second pass using a second motion vector from the set of motion vectors; and
      combining the first reference frame portion and the second reference frame portion to form a bi-directionally predicted portion, wherein the set of motion vectors comprises no more than the maximum number of motion vectors accompanying a p-frame.

2. The method of claim 1, further comprising:
   receiving encoded data representing the first reference frame and the second reference frame, over a wireless network; and
   receiving encoded data identifying the location of the first reference frame portion and the second reference frame portion over the wireless network.

3. The method of claim 2, further comprising:
   encoding a first inter-coded portion of multimedia data in a base layer of a scalable video coded bitstream;
   encoding a second bi-directional portion of multimedia data in an enhancement layer of the scalable video coded bitstream, wherein the multimedia data comprises data representing the first reference frame, the second reference frame, and data identifying the location of the first reference frame portion and the second reference frame portion; and transmitting the multimedia data over the wireless network.

4. The method of claim 1, further comprising:
interpolating pixels of the first reference frame in the first pass; and
interpolating pixels of the second reference frame in the second pass.

5. The method of claim 4, further comprising:
padding the border edges of the first reference frame in the first pass; and
padding the border edges of the second reference frame in the second pass.

6. The method of claim 1, further comprising:
locating the reference frame portions with motion vectors.

7. The method of claim 1, further comprising:
adding a residual error to the bi-directionally predicted portion.

8. The method of claim 1, further comprising:
displaying the bi-directionally predicted portion.

9. The method of claim 1, further comprising:
performing the first and second passes in series.

10. The method of claim 1, further comprising:
determining to omit the decoding of an enhancement-layer bi-directional frame predicted from two reference frames so as to perform temporal scaling.

11. The method of claim 1, wherein using a motion compensation codec comprises:
reusing base layer decoding components for decoding the bi-directional frame;
combining a plurality of macroblocks to form a combined macroblock, the motion vector of the combined macroblock being based on the motion vector of at least one of the plurality of macroblocks.

12. The method of claim 1, wherein the base layer components comprise an additional memory buffer used when decoding B-frames.

13. The method of claim 12, wherein using base layer decoding components comprises using a first decoding component to locate the first portion from the first reference frame and reusing the first decoding component to locate the second portion from the second reference frame.

14. The method of claim 1, wherein the base layer components of the motion compensation codec are only capable of locating reference frame portions from one reference frame at a time.

15. An apparatus for decoding an enhancement-layer bi-directional frame, comprising:
means for receiving an enhancement layer bi-directional frame comprising a set of motion vectors;
base layer components of a motion compensation codec comprising:
means for locating a first reference frame portion from a first reference frame in a first pass using a first motion vector from the set of motion vectors;
means for storing the first reference frame portion in memory;
means for locating a second reference frame portion from a second reference frame in a second pass using a second motion vector from the set of motion vectors; and
means for combining the first reference frame portion and the second reference frame portion to form a bi-directionally predicted portion, wherein the set of motion vectors comprises no more than the maximum number of motion vectors accompanying a p-frame.

16. The apparatus of claim 15, further comprising:
means for receiving encoded data representing the first reference frame and the second reference frame, over a wireless network; and
means for receiving encoded data identifying the location of the first reference frame portion and the second reference frame portion over the wireless network.

17. The apparatus of claim 15, further comprising:
means for interpolating pixels of the first reference frame in the first pass; and
means for interpolating pixels of the second reference frame in the second pass.

18. The apparatus of claim 17, further comprising:
means for padding the border edges of the first reference frame in the first pass; and
means for padding the border edges of the second reference frame in the second pass.

19. The apparatus of claim 15, further comprising:
means for locating the reference frame portions with motion vectors.

20. The apparatus of claim 15, further comprising:
means for adding a residual error to the bi-directionally predicted portion.

21. The apparatus of claim 15, further comprising:
means for displaying the bi-directionally predicted portion.

22. The apparatus of claim 15, further comprising:
means for performing the first and second passes in series.

23. The apparatus of claim 15, further comprising:
means for determining to omit the decoding of an enhancement-layer bi-directional frame predicted from two reference frames so as to perform temporal scaling.

24. The apparatus of claim 15, wherein the base layer components of the motion compensation codec are only capable of locating reference frame portions from one reference frame at a time.

25. An electronic device for decoding an enhancement-layer bi-directional frame comprising:
base layer components of a motion compensation codec configured to receive an enhancement-layer bi-directional frame, the enhancement-layer bi-directional frame comprising a set of motion vectors, the base layer components further configured to:
locate a first reference frame portion from a first reference frame in a first pass using a first motion vector from the set of motion vectors,
store the first reference frame portion in memory, to locate a second reference frame portion from a second reference frame in a second pass using a second motion vector from the set of motion vectors, and
combine the first reference frame portion and the second reference frame portion to form a bi-directionally predicted portion, wherein the set of motion vectors comprises no more than the maximum number of motion vectors accompanying a p-frame.

26. The electronic device of claim 25, further configured to receive encoded data representing the first reference frame and the second reference frame, over a wireless network, and to receive encoded data identifying the location of the first reference frame portion and the second reference frame portion over the wireless network.

27. The electronic device of claim 25, further configured to interpolate pixels of the first reference frame in the first pass, and to interpolate pixels of the second reference frame in the second pass.

28. The electronic device of claim 27, further configured to pad the border edges of the first reference frame in the first pass, and to pad the border edges of the second reference frame in the second pass.

29. The electronic device of claim 25, further configured to locate the reference frame portions with motion vectors.

30. The electronic device of claim 25, further configured to add a residual error to the bi-directionally predicted portion.

31. The electronic device of claim 25, further configured to display the bi-directionally predicted portion.

32. The electronic device of claim 25, further configured to perform the first and second passes in series.

33. The electronic device of claim 25, further configured to determine to omit the decoding of an enhancement-layer bi-directional frame predicted from two reference frames so as to perform temporal scaling.

34. The electronic device of claim 25, wherein using base layer decoding components comprises using a first decoding component to locate the first portion from the first reference frame and reusing the first decoding component to locate the second portion from the second reference frame.

35. The electronic device of claim 25, wherein the base layer components of the motion compensation codec are only capable of locating reference frame portions from one reference frame at a time.

36. A non-transitory computer readable medium having instructions for causing a computer to execute a method for decoding an enhancement-layer bi-directional frame, comprising:
  receiving an enhancement layer bi-directional frame comprising a set of motion vectors;
  instructing base layer components of a motion compensation codec, to perform the steps of:
    locating a first reference frame portion from a first reference frame in a first pass using a first motion vector from the set of motion vectors;
    storing the first reference frame portion in memory;
    locating a second reference frame portion from a second reference frame in a second pass using a second motion vector from the set of motion vectors; and
    combining the first reference frame portion and the second reference frame portion to form a bi-directionally predicted portion, wherein the set of motion vectors comprises no more than the maximum number of motion vectors accompanying a p-frame.

37. The non-transitory computer readable medium of claim 36, wherein using base layer decoding components comprises using a first decoding component to locate the first portion from the first reference frame and reusing the first decoding component to locate the second portion from the second reference frame.

38. The non-transitory computer readable medium of claim 36, wherein the base layer components of the motion compensation codec are only capable of locating reference frame portions from one reference frame at a time.

39. A method for decoding an enhancement-layer bi-directional frame, comprising:
  using base layer components of a motion compensation codec that are only capable of locating reference frame portions from one reference frame at a time for decoding the enhancement-layer bi-directional frame, to perform the steps of:
  locating a first reference frame portion from a first reference frame in a first pass;
  storing the first reference frame portion in memory;
  locating a second reference frame portion from a second reference frame in a second pass; and
  combining the first reference frame portion and the second reference frame portion to form a bi-directionally predicted portion,
  wherein locating a first reference frame portion comprises using a motion vector from a first set of motion vectors and wherein locating a second reference frame portion comprises using a motion vector from a second set of motion vectors, each of the first and second sets of motion vectors configured so as to contain no more than half the maximum number of motion vectors accompanying a p-frame.

* * * * *